United States Patent [19]

Pfahl, Jr.

[11] 3,947,240

[45] Mar. 30, 1976

[54] METHOD AND APPARATUS FOR GENERATING A VAPOR FOR SOLDERING, FUSING OR BRAZING ARTICLES

[75] Inventor: Robert C. Pfahl, Jr., Glen Ellyn, Ill.

[73] Assignee: Western Electric Company, Inc., New York, N.Y.

[22] Filed: Nov. 1, 1974

[21] Appl. No.: 520,182

[52] U.S. Cl. .................. 432/28; 165/105; 432/210
[51] Int. Cl.² ........................................ F27D 17/00
[58] Field of Search ............... 432/28, 210; 165/105

[56] References Cited
UNITED STATES PATENTS

| | | | |
|---|---|---|---|
| 2,153,942 | 4/1939 | Spalding, Jr. | 165/105 |
| 3,710,450 | 1/1973 | Figiel | 34/9 |
| 3,732,063 | 5/1973 | Corsaro et al. | 432/210 X |

Primary Examiner—John J. Camby
Attorney, Agent, or Firm—R. A. Lloyd

[57] ABSTRACT

A heat transfer liquid having a boiling point at atmospheric pressure at least equal to the temperature at which a soldering, fusing or brazing operation is to be performed, is floated on a pool of a liquifiable metal having a density greater than, a melting point below, and a heat of vaporization above, that of the liquid. The metal is heated to a temperature between its melting and boiling points, and at least to the boiling point of the liquid, to continuously boil the liquid to establish a body of hot, saturated vapor having a density greater than that of air at atmospheric pressure. An article on which the soldering, fusing or brazing operation is to be performed is extended into the body of vapor to condense the vapor thereon. The latent heat of vaporization of the condensing vapor heats the article to the temperature for the operation, and the article is then withdrawn from the vapor for cooling.

6 Claims, 1 Drawing Figure

METHOD AND APPARATUS FOR GENERATING A VAPOR FOR SOLDERING FUSING OR BRAZING ARTICLES

BACKGROUND OF THE INVENTION

1. Field of the Invention

The present invention relates to methods of and apparatus for generating a vapor for heating articles, and in particular to a method of and an apparatus for generating a vapor for heating an article by boiling a liquid which is floating on a pool of molten metal.

2. Description of the Prior Art

In soldering, fusing or brazing an article, it is necessary to heat the article to elevate its temperature in order to perform the operation. Although the present invention for heating articles is not to be construed as limited to soldering, its background is most readily understood in the context of soldering.

Soldering operations require that the elements to be soldered be heated to a temperature sufficiently high to melt solder thereon, which elements are preferably protected from oxidation during the soldering operation. Conventionally, a soldering iron is used, and the elements are coated with a flux on those areas to be soldered to prevent oxidation thereof during soldering. While the soldering iron is useful in many instances, it is not well suited to rapid mass soldering operations in which, for example, a printed circuit board or terminal array may have many closely spaced connections to be soldered.

One prior art improvement over the soldering iron technique for use in mass soldering operations is disclosed in U.S. Pat. No. 3,359,132, which issued on Dec. 19, 1967, to A. E. Wittmann. In this patent a circuit board, which has a coating of flux, is suspended in close proximity to the surface of a hot layer of peanut oil, which is floated on a pool of molten solder, for being preheated by a combination of radiation and air convection. The circuit board is then lowered through the layer of peanut oil and into the molten solder wherein the soldering operation takes place. This technique has the disadvantage of requiring the cleansing of the circuit board to remove the peanut oil therefrom after the circuit board is again passed through the layer of peanut oil upon its removal from the molten solder.

Recently, a new soldering technique was developed and placed in commercial use. With this technique, which is the subject of U.S. Pat. No. 3,866,307 issued Feb. 18, 1975, and assigned to the assignee of the present invention, the article to be soldered (or fused or brazed) is placed in hot saturated vapors generated by continuously boiling within a vessel a heat transfer liquid having selected properties including a boiling point at least equal to, and preferably above, the temperature required for the soldering operation. Vapors condense on the article and give up their latent heating of vaporization to heat the article to the temperature required for soldering. In one specific application, the process is employed to effect mass reflow soldering.

The soldering technique described in the preceding paragraph represents, in the opinion of those familiar with soldering, fusing or brazing operations, a state of the art advance. In the practice of such technique, however, some of the saturated vapors of the heat transfer liquid escape from the vessel and are lost to the atmosphere where the process is open to the atmosphere. The heat transfer liquid presently employed in the practice of the preferred embodiment of the technique is a florinated polyoxypropylene, such as that sold by E. I. DuPont de Nemours and Company under the name "Freon E5," and under presently prevailing price schedules is quite expensive. Consequently, losses of the vapors to the atmosphere represent an economic charge against the technique as presently practiced, and it is desirable that these losses be reduced or eliminated.

To overcome the loss of "Freon E5" to the atmosphere, an improvement in the above technique was developed, and is the subject matter of pending U.S. patent application Ser. No. 476,343, filed June 5, 1974, now U.S. Pat. No. 3,904,102, and also assigned to the assignee of the present invention. In this improved technique, heated vapors of a relatively inexpensive secondary liquid are interposed between the heated vapors of the "Freon E5," hereinafter referred to as the primary liquid, and the atmosphere. This is accomplished by boiling a mixture of the primary and the secondary liquids in the lower portion of a vessel to generate hot saturated primary and secondary vapors thereof in the upper portion of the vessel. The secondary liquid is chosen such that the boiling point thereof is lower than the boiling point of the primary liquid, and such that the secondary vapors generated upon the boiling thereof have a density less than the density of the primary vapors generated upon the boiling of the primary liquid, and greater than the density of air at atmospheric pressure. In this manner, as both of the liquids are boiled, the secondary vapors form in the vessel a barrier between the primary vapors and the atmosphere to prevent, or minimize, the loss of primary vapors to the atmosphere. An article to be soldered in accordance with this technique is extended through the secondary vapors and into the primary vapors for being heated to the soldering temperature as the vapors condense thereon, and is then removed through the layer of the secondary vapors for cooling in the atmosphere.

In the practice of either of the above two soldering techniques, with or without the secondary vapor intermediate the primary vapor and the atmosphere, the liquid is customarily heated in the bottom of the vessel by an immersion heater to generate the vapor thereabove. When this is the case, the immersion heater must be completely surrounded by the liquid at all times to prevent its destruction as a result of superheating. Where the secondary vapor is not generated, the liquid surrounding the immersion heater is purely primary liquid, and where the secondary vapor is generated, the relative quantities of primary and secondary liquids is such that the liquid surrounding the immersion heater is essentially primary liquid.

The minimum volume of primary liquid required in a vessel, where an immersion heater is used, is mainly determined by the weight of the article to be heated. That is, the weight of the article determines the power required to heat the primary liquid, which in turn determines the size of the immersion heating element, or the number of immersion heating elements, required in the bottom of the vessel, which then in turn determines the minimum volume of primary liquid required in the vessel to ensure that the heating element is completely covered. In other words, a sufficient volume of primary liquid must be maintained in the vessel to ensure that the heating element remains covered at all times, which volume is much greater than that required for only generating vapors to be condensed upon an article. For example, with one current facility for vapor condensation heating of articles, which employs a 20 watt/cm² immersion heating element, approximately 65 gallons of primary liquid are required in a vessel for soldering 75 pound articles. Of the 65 gallons of primary liquid, approximately 55 gallons thereof are employed solely to cover the heating element to prevent the destruction thereof. At the present price of "Freon E5," which is a preferred primary liquid, this represents a considerable additional expense. Furthermore, when the primary liquid surrounds the heating element, it is possible for film boiling thereof to occur, resulting in destruction of the heating element.

SUMMARY OF THE INVENTION

In accordance with the present invention, a body of condensible vapor of a heat transfer liquid, at an elevated temperature, to be condensed on an article to heat the article by the transfer of the latent heat of vaporization thereof to the article is established by heating a liquifiable metal, having a density greater than the density of the heat transfer liquid and a melting point below the elevated temperature, to at least the elevated temperature to form a pool of molten metal, and by floating a layer of the heat transfer liquid, which boils at the elevated temperature, on the pool of molten metal to form a stratified layer of the heat transfer liquid on the pool of molten metal, and to heat and boil the heat transfer liquid to form the body of condensible vapor of the heat transfer liquid, at the elevated temperature, above the heat transfer liquid.

Preferably, the condensible vapor is generated substantially at atmospheric pressure in a vessel which is open to the atmosphere, for being condensed on an article extended into the vessel, the vapor being denser than air at atmospheric pressure. In this case, the heat transfer liquid and the liquifiable metal are combined in the lower portion of the vessel, and sufficient heat is applied to the heat transfer liquid and the liquifiable metal in the lower portion of the vessel to melt the metal to form a molten pool of metal with the less dense heat transfer liquid stratified on top of the pool of metal in the lower portion of the vessel, and to continuously boil substantially at atmospheric pressure the heat transfer liquid to form the body of condensible vapor of the heat transfer liquid, at the elevated temperature, in the upper portion of the vessel.

Other advantages and features of the invention will be apparent upon consideration of the following detailed description when taken in conjunction with the appended drawing.

Detailed Description

Figure 1:
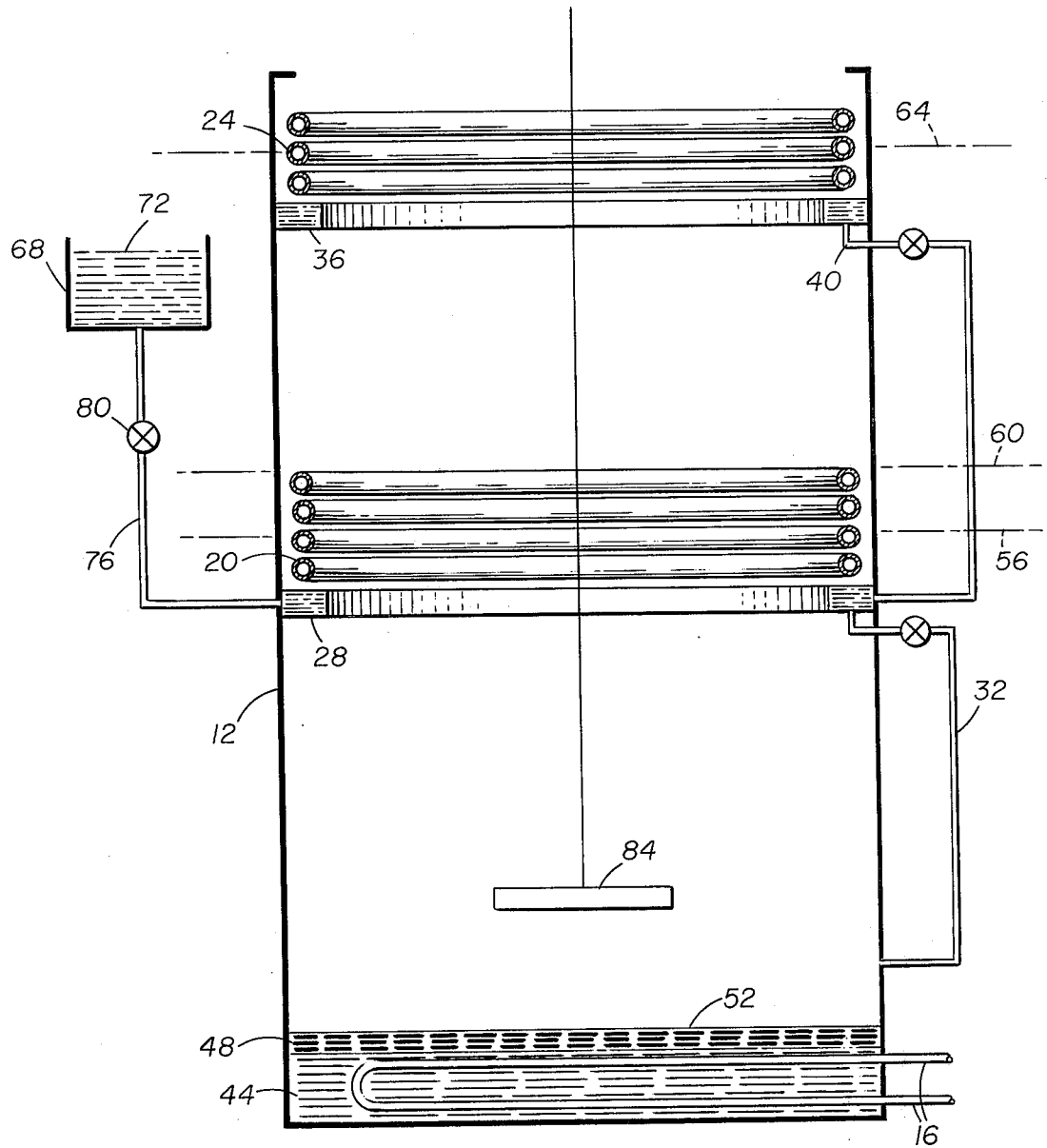
FIG. 1 illustrates diagramatically a partially sectional elevation view of an apparatus for practicing the present invention.

An apparatus for generating condensible vapors for soldering, fusing or brazing articles, as shown in FIG. 1, includes a vessel 12, open to the atmosphere, with a heating element, or coil 16, at the lower end thereof, which heating coil may be, for example, electrically operated. A primary set of cooling coils 20 is positioned intermediate the top and the bottom of the vessel 12, and have circulated therethrough a coolant (i.e., water) from a source not shown. A secondary set of cooling coils 24 is positioned adjacent the upper portion of the vessel 12, and also have circulated therethrough a coolant (i.e., water) from a source not shown. In the practice of the invention, the temperature of the coolant circulated through the secondary cooling coils 24 is lower than that of the coolant circulated through the primary coils 20, and the secondary coils 24 are therefore operated at a lower temperature than the primary coils 20.

A primary trough 28 is mounted around the inner periphery of the vessel 12 immediately below the primary cooling coils 20, and is adapted to receive condensate draining off of the coils 20 and to discharge the condensate into a valved line 32 communicating with the lower portion of the vessel 12. A secondary trough 36 is mounted around the inner periphery of the vessel 12 immediately below the secondary set of cooling coils 24, and is adapted to receive condensate draining off of the coils 24 and to discharge the condensate into a valved line 40 which communicates with the primary trough 28.

A liquifiable metal, preferably eutectic tin-lead solder, is introduced into the bottom of the vessel 12 and is heated by the heating coil 16 to form a molten pool of metal, or solder 44, in the bottom of the vessel 12. The amount of solder introduced into the vessel 12 is at least sufficient to completely cover the heating coil 16, and operates to continuously surround the heating coil to prevent superheating and destruction thereof which would result in the absence of a heat absorbing medium therearound.

A mixture of two liquids 48, which together and individually have a density less than the density of the molten solder 44, and which are selected as hereinafter described, is introduced into the vessel 12 and onto the pool of molten solder 44 to a level generally indicated by the numeral 52. As the liquids 48 have a density less than that of the molten solder 44, they float, or form a stratified layer on top of the solder, and are brought to and maintained at a continuous boil by the heat of the molten solder which acts as a heat transfer medium between the heating coil 16 and the liquids 48.

One of the two liquids of the mixture 48 is a primary heat transfer liquid characterized by the following general properties:

a. the primary liquid must have a boiling point at atmospheric pressure at least equal to, and preferably above, the temperature required for the soldering (or fusing or brazing) operation; i.e., in a soldering operation, this boiling point is at least equal to, and preferably above, the melting point of the solder used in the operation;

b. the primary liquid must produce a saturated vapor which, for the embodiments disclosed herein, is denser than air at atmospheric pressure;

c. the primary liquid desirably has a sharply defined and substantially constant boiling point for better control over the process, and d. the primary liquid desirably produces a saturated vapor which is non-oxidizing, chemically stable and inert, non-toxic and non-inflammable.

In addition, when the method of the invention is practiced on an article such as a printed circuit board having electrical components mounted thereon to be soldered, the primary liquid should not be electrically conducting.

The other of the two liquids of the mixture 48 is a secondary liquid characterized by the following general properties;

a. the secondary liquid must have a lower boiling point at atmospheric pressure than the primary liquid;

b. the secondary liquid must produce a vapor which, for the embodiments disclosed herein, is less dense at atmospheric pressure than the saturated vapor from the primary liquid at this pressure, and which is also denser than air at atmospheric pressure;

c. the secondary liquid desirably does not form an azeotrope with the primary liquid;

d. the secondary liquid desirably produces a saturated vapor which does not support a high equilibrium moisture content, and e. the secondary liquid desirably produced a saturated vapor which is non-oxidizing, chemically stable, non-toxic and non-inflammable.

In addition, similar to the primary liquid, when the method of the invention is employed upon an article such as a printed circuit board having electrical components mounted thereon to be soldered, the secondary liquid should not be electrically conducting.

When the mixture of the primary and the secondary liquids 48 has been brought to a boil, as a result of the transfer of heat from heating coil 16 to the liquids 48 through the molten pool of solder 44, the lower boiling point secondary liquid boils off first and the saturated, condensible vapors thereof, hereinafter termed secondary vapors, fill the vessel 12 up to some level as determined by the quantity of secondary liquid in the liquid mixture 48. After the secondary liquid has been boiled off, the remaining primary liquid is further heated until its boiling point is reached, whereupon it boils and produces hot, saturated, condensible vapors thereof, hereinafter termed primary vapors. Since the primary vapors are denser than the secondary vapors, the lighter secondary vapors are pushed upwardly in the vessel 12 by the primary vapors and are stratified over, and float on, the primary vapors to form a vapor blanket, or barrier, between the primary vapors and the atmosphere.

The relative proportions of the primary and the secondary liquids in the mixture 48 are determined by the geometry of the vessel 12, the locations of the primary and the secondary sets of cooling coils 20 and 24, respectively, within the vessel 12, and the desired thickness of the layer of secondary vapor over the primary vapor. Specifically, the proportions of the primary and the secondary liquids are chosen so that, at equilibrium after startup as hereinabove described, there exists in the vessel 12 a body of hot saturated essentially primary vapor, the top of which is approximately at the level indicated diagramatically by the phantom line 56 extending through the primary set of cooling coils 20, there exists a body of a mixture of primary and secondary vapors extending from the level indicated diagramatically by the phantom line 56 up to a level indicated diagramatically by a phantom line 60, and there exists a body of saturated essentially secondary vapor extending from the level indicated diagramatically by the phantom line 60 up to a level indicated diagramatically by a phantom line 64 extending through the secondary set of cooling coils 24.

The primary set of cooling coils 20 is maintained at a temperature below the condensation temperature of the primary vapor, and the secondary set of cooling coils 24 is maintained at a temperature below the condensation temperature of the secondary vapor. Condensate draining off of the primary set of coils 20, which is essentially primary liquid, is collected in the primary trough 28 and returned to the lower portion of the vessel 12 through the line 32. Condensate draining off of the secondary set of cooling coils 24, which is essentially secondary liquid, is collected in the secondary trough 26 and returned through the line 40 to the primary trough 28 wherein it is reboiled and revaporized and returned as secondary vapor to the upper portion of the vessel. The reboiling occurs because the primary liquid condensate within the trough 28 is at a temperature above the boiling point of the secondary liquid.

As the hot saturated primary vapor is denser than both air and the hot secondary vapor, it occupies the lower portion of the vessel 12 above the mixture 48. As the saturated secondary vapor is denser than air and lighter than the primary vapor, it occupies the upper portion of the vessel above the body of primary vapor. Therefore, the body of saturated secondary vapor acts as a barrier, or lid, over the body of hot saturated primary vapor, and at no time is there an interface between the body of primary vapor and the atmosphere. This reduces, or substantially eliminates, any loss of the hot saturated primary vapors to the atmosphere.

To compensate for secondary vapor losses to the atmosphere, a tank 68 containing a supply 72 of secondary liquid is connected through a line 76 to the primary trough 28. Secondary liquid 72 from the tank 68 is fed to the primary trough 28 and is boiled off therefrom by the heat of the primary liquid condensate therein. A valve 80 in the line 76 regulates the flow of secondary liquid to the trough 28, and may be a control valve operated in a manner known to those familiar with the art by sensors detecting a drop in the elevation of the top of the body of secondary vapor, or by sensors detecting changes in secondary vapor concentration in the upper portion of the vessel 12.

In use, an article 84, such as a printed circuit board with electrical components mounted thereon to be soldered, is lowered into the vessel 12 through the body of secondary vapor and into the body of hot saturated primary vapor below the primary set of cooling coils 20. The article 84 is held suspended in this position, and hot saturated primary vapors condense on the article and give up their latent heat of vaporization to heat the article until the temperature thereof approaches or reaches the temperature of the saturated primary vapor, which is the boiling point of the primary heat transfer liquid and which, as hereinabove mentioned, is at least equal to, and preferably above, the melting point of the solder. The article 84 approaches or reaches the temperature of the hot saturated vapors quite rapidly, because heat transfer coefficients for condensation processes are among the highest known for any mode of heat transfer. This minimizes the time required for the article to be positioned within and subjected to the heat of the primary vapors, and therefore minimizes the time available for thermal degradation of components thereon. After the solder on the article has melted or reflowed, the article is removed from the vessel 12, through the body of secondary vapor blanketing the body of primary vapor, and cooled to ambient temperature.

In a specific example for generating vapors to heat an article 84 wherein the article is a printed circuit board, and electrical components are to be soldered thereto with solder melting at 369°F (182.2°C), the primary heat transfer liquid advantageously is selected from the group of liquids known generically as fluorocarbons, such as florinated polyoxypropylene. Such a liquid is sold by E. I. DuPont de Nemours and Company under the name "Freon E5," and has the following significant properties:

Boiling point at atmospheric pressure — 435.6°F (224.2°C);
Electrical resistivity — greater than $4 \times 10^{14}$ ohm-cm;
Dielectric constant — 2.45;
Latent heat of vaporization — 19.9 btu/lb;
Density of saturated vapor at boiling point and atmospheric pressure — 1.45 lb/ft$^3$.

A suitable secondary liquid adapted for use with "Freon E5" as the primary heat transfer liquid advantageously is selected from the group of liquids generically known as halogenated hydrocarbons, such as trichlorotrifluoro-ethane. Such a liquid is sold by E. I. DuPont de Nemours under the name "Freon TF" and has the following significant properties:

Boiling point at atmospheric pressure — 117.6°F (47.6°C);
Electrical resistivity — greater than $2 \times 10^{15}$ ohm-cm;
Dielectric constant — 2.41;
Latent heat of vaporization — 63.12 btu/lb;
Density of saturated vapor at boiling point and atmospheric pressure — 1.45 lb/ft$^3$.

At this point, the advantages of employing molten solder to cover the heating element 16 should be noted. Not only is solder a relatively inexpensive substitute for liquid "Freon E5," but it is compatible with "Freon E5" at the operating temperature, is thermally stable, has excellent heat transfer characteristics, and is denser than the primary liquid to insure stratification of the primary liquid thereabove. Furthermore, the operating temperature of the heating coil 16 is below the boiling point of the pool of solder 44, and accordingly there is no possibility of film boiling of the solder which could result in superheating and failure of the heating coil 16.

One suitable proportion for the primary and the secondary liquids in the practice of the invention, assuming sufficient solder in the bottom of the vessel 12 to completely cover the heating coil 16, wherein "Freon E5" is employed as the primary liquid and "Freon TF" as the secondary liquid, is 5 percent "Freon TF" by volume of the mixture of the two liquids. In this case, the primary set of cooling coils 20 are preferably operated at 80°F (26.7°C) and the secondary set of cooling coils 24 at approximately 40°F (4.4°C). It is understood, of course, that the heating coils 16 must heat the pool of molten solder 40 to at least, and preferably above, the boiling point of the primary liquid in order to boil the primary liquid.

While one particular embodiment of the invention has been described in detail, it is understood that various other embodiments and modifications thereof could be devised by one skilled in the art without departing from the spirit and scope of the invention. For example, while the use of a secondary liquid for generating a secondary vapor over the primary vapor is advantageous for minimizing the loss of primary vapor to the atmosphere, the invention could just as readily be practiced without a secondary liquid. In this case, only the primary liquid would be stratified and boiled on the molten solder, the solder still operating to greatly reduce the total amount of primary liquid which would otherwise be required in the vessel to ensure that the heating coil remains covered at all times. Also, while the primary liquid has been described as advantageously being a fluorocarbon, any other type of primary liquid could be used which has suitable properties (i.e., vapor density and latent heat of vaporization) for accomplishing a particular heating operation. Similarly, while the metal upon which the primary liquid is stratified has been described as solder, any other metal having a suitable melting and boiling point and compatibility with the primary fluid could readily be employed. Furthermore, while the description of the invention has been directed toward generating a vapor for melting solder on an article, a vapor for performing a fusing or a brazing operation on an article could just as readily be established. In this case, a primary liquid having suitable properties, including a boiling point at least equal to the temperature required for performing the fusing or brazing operation, would be employed.

What is claimed is:

1. In a method of establishing a body of condensible vapor of a heat transfer liquid at an elevated temperature, to be condensed on an article to heat the article by the transfer of the latent heat of vaporization thereof to the article:

heating a liquifiable metal, having a density greater than the density of the heat transfer liquid and a melting point below the elevated temperature, to at least the elevated temperature to form a pool of molten metal, and floating a layer of the heat transfer liquid, which boils at the elevated temperature, on the pool of molten metal to form a stratified layer of the heat transfer liquid on the pool of molten metal, to heat and to boil the heat transfer liquid to form the body of condensible vapor of the heat transfer liquid, at the elevated temperature, above the heat transfer liquid.

2. In a method of generating substantially at atmospheric pressure a body of condensible vapor of a heat transfer liquid at an elevated temperature, which is at least equal to the melting point of solder, to be condensed on an article having solder thereon to heat the article and to reflow the solder by the transfer of the latent heat of vaporization thereof to the article:

heating a liquifiable metal, having a melting point below, and a boiling point above, the elevated temperature, to at least the elevated temperature and to less than its boiling point, to form a pool of molten metal, and stratifying the heat transfer liquid, which has a density less than the density of the molten metal and boils at the elevated temperature, on the pool of molten metal, to heat the heat transfer liquid to the elevated temperature and to boil the heat transfer liquid substantially at atmospheric pressure to generate the body of condensible vapor of the heat transfer liquid at the elevated temperature above the heat transfer liquid.

3. In a method of establishing a body of condensible vapor of a heat transfer liquid, at an elevated temperature, to be condensed on an article extended therein to heat the article:

combining the heat transfer liquid, which boils at the elevated temperature, with a liquifiable metal, the heat transfer liquid having a density less than the density of the metal, and the metal having a melting point below, and a boiling point above, the boiling point of the heat transfer liquid, and applying sufficient heat to the liquifiable metal and the heat transfer liquid to melt the metal to form a pool of metal with the less dense heat transfer liquid stratified on top of the pool of metal, and to elevate the temperature of the heat transfer liquid to continuously boil the heat transfer liquid to form the body of condensible vapor of the heat transfer liquid, at the elevated temperature, above the heat transfer liquid.

4. In a method of generating substantially at atmospheric pressure a body of a condensible vapor of a heat transfer fluid at an elevated temperature, in a vessel which is open to the atmosphere, to be condensed on an article extended into the vessel to heat the article by the transfer of the latent heat of vaporization of the vapor thereto, the vapor being denser than air at atmospheric pressure:

combining in the lower portion of the vessel the heat transfer liquid, which boils at the elevated temperature, and a liquifiable metal, the heat transfer liquid having a density less than the liquifiable metal, and the liquifiable metal having a melting point below the elevated temperature, applying sufficient heat to the heat transfer liquid and the liquifiable metal in the lower portion of the vessel to melt the liquifiable metal to form a molten pool of metal with the less dense heat transfer liquid stratified on top of the pool of metal in the lower portion of the vessel, and to continuously boil substantially at atmospheric pressure the heat transfer liquid to form the body of condensible vapor of the heat transfer liquid, at the elevated temperature, in the upper portion of the vessel.

5. In an apparatus for generating a body of a condensible vapor of a heat transfer liquid for heating an article extended therein by the transfer of the latent heat of vaporization of the vapor to the article:

a vessel, open to the atmosphere;

a supply of the heat transfer liquid and a liquifiable metal in the lower end of the vessel, the heat transfer liquid having a density less than the density of the metal and the vapors of the heat transfer liquid having a density greater than air at atmospheric pressure, and the liquifiable metal having a melting point below, and a boiling point above, the boiling point of the heat transfer liquid, and means for heating the heat transfer liquid and the liquifiable metal in the lower end of the vessel to melt the liquifiable metal to form a pool of molten metal with the less dense heat transfer liquid stratified on top of the pool of molten metal, and to boil the heat transfer liquid to generate thereabove in the upper portion of the vessel the condensible vapors of the heat transfer liquid.

6. In an apparatus for generating a body of a condensible vapor of a heat transfer liquid for heating an article extended therein by the transfer of the latent heat of vaporization of the vapor to the article:

a vessel, open to the atmosphere;

a supply of the heat transfer liquid and a liquifiable metal in the lower end of the vessel, the heat transfer liquid having a density less than the density of the metal and the vapors of the heat transfer liquid having a density greater than air at atmospheric pressure, and the liquifiable metal having a melting point below, and a boiling point above, the boiling point of the heat transfer liquid, and a heating element, in the bottom of the vessel, for heating the heat transfer liquid and the liquifiable metal to melt the liquifiable metal to form a pool of molten metal with the less dense heat transfer liquid stratified on top of the pool of molten metal, and to boil the heat transfer liquid to generate thereabove in the upper portion of the vessel the condensible vapors of the heat transfer liquid, the supply of metal being sufficient to completely surround the heating element to continuously absorb heat therefrom.

\* \* \* \* \*